(12) United States Patent
Tamura et al.

(10) Patent No.: US 11,421,774 B2
(45) Date of Patent: Aug. 23, 2022

(54) POWER TRANSMISSION DEVICE AND MOTOR UNIT

(71) Applicant: Nidec Corporation, Kyoto (JP)

(72) Inventors: Tsubasa Tamura, Kyoto (JP); Keisuke Aso, Kyoto (JP); Shuhei Nakamatsu, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

(21) Appl. No.: 17/481,367

(22) Filed: Sep. 22, 2021

(65) Prior Publication Data

US 2022/0099177 A1 Mar. 31, 2022

(30) Foreign Application Priority Data

Sep. 30, 2020 (JP) .............................. JP2020-166448

(51) Int. Cl.
*F16H 57/04* (2010.01)
*F16H 57/03* (2012.01)
(Continued)

(52) U.S. Cl.
CPC ........... *F16H 57/0424* (2013.01); *B60K 1/00* (2013.01); *F16H 57/031* (2013.01); *F16H 57/037* (2013.01); *F16H 57/045* (2013.01); *F16H 57/0457* (2013.01); *F16H 57/0471* (2013.01); *F16H 57/0476* (2013.01); *F16H 57/0483* (2013.01); *B60K 2001/001* (2013.01); *F16H 2057/02008* (2013.01); *F16H 2057/02034* (2013.01); *F16H 2057/02052* (2013.01)

(58) Field of Classification Search
CPC .. F16H 57/0424; F16H 57/031; F16H 57/037; F16H 57/045; F16H 57/0457; F16H 57/0471; F16H 57/0476; F16H 57/0483; F16H 2057/02008; F16H 2057/02034; F16H 2057/02052; B60K 1/00; B60K 2001/001
See application file for complete search history.

(56) References Cited

U.S. PATENT DOCUMENTS

| 5,832,789 A | * | 11/1998 | Kinto | ..................... | H02K 7/116 74/421 A |
| 6,059,684 A | * | 5/2000 | Sasaki | ..................... | B60K 1/00 180/65.6 |

(Continued)

FOREIGN PATENT DOCUMENTS

JP 11-11169 A 1/1999

*Primary Examiner* — Colby M Hansen
(74) *Attorney, Agent, or Firm* — Keating & Bennett (57) ABSTRACT

A bearing device includes a gear portion and a gear housing that houses the gear portion and stores a lubricant therein. The gear housing includes a side plate extending in a direction intersecting the axial direction, a recess recessed from the side plate toward the other side in the axial direction, a saucer opened upward, and a groove including a shaft opening opposing the gear housing and a peripheral opening opened to the recess. The gear portion includes an output shaft rotatably supported by the gear housing via a bearing, and a first gear connected to the output shaft. The saucer includes an opposing surface opposing an outer peripheral surface of the first gear. The groove is inclined downward toward the peripheral opening and reaches the bearing, and the shaft opening of the groove reaches the saucer.

11 Claims, 9 Drawing Sheets

(51) Int. Cl.
*B60K 1/00* (2006.01)
*F16H 57/037* (2012.01)
*F16H 57/031* (2012.01)
*F16H 57/02* (2012.01)

(56) References Cited

U.S. PATENT DOCUMENTS 6,729,990 B1 * 5/2004 Haupt .................. F16H 3/663
475/59
11,293,538 B2 * 4/2022 Inoue .................. H02K 11/21

* cited by examiner

POWER TRANSMISSION DEVICE AND MOTOR UNIT

CROSS-REFERENCE TO RELATED APPLICATIONS

The present application claims priority under 35 U.S.C. § 119 to Japanese Patent Application No. 2020-166448, filed on Sep. 30, 2020, the entire contents of which are hereby incorporated herein by reference.

1. FIELD OF THE INVENTION

The present disclosure relates to a power transmission device that transmits power and a motor assembly including the power transmission device.

2. BACKGROUND

In the related art, a vehicle transaxle in which lubricating oil for a transmission device and a differential is introduced into a housing is known.

However, in the case of a configuration in which lubricating oil is scraped up by a differential or a reduction gear, it is necessary to supply the lubricating oil to a bearing disposed in a recessed portion such as the differential.

SUMMARY

A power transmission device according to an example embodiment of the present disclosure includes a gear portion that is connected to one side in an axial direction of a power shaft which rotates about a rotation axis extending along a horizontal direction, and a gear housing that houses the gear portion, and stores a lubricant therein. The gear housing includes a side plate at an end on another side in the axial direction and widens in a direction intersecting the axial direction, a tubular recess that is recessed to the another side in the axial direction from the side plate, and opens to the one side in the axial direction, a saucer that extends to the one direction in the axial direction from the side plate and opens upward, and a groove that is provided on a surface of the side plate on the one side in the axial direction, includes a shaft opening opposing an inside of the gear housing, and includes a peripheral opening that opens to an inner peripheral surface of the recess. The gear portion includes a bearing that is at an end of the recess on the another side in the axial direction, an output shaft that extends along the rotation axis, and is rotatably supported by the gear housing with the bearing interposed therebetween, and a first gear that is connected to the output shaft. The saucer includes an opposing surface opposing at least an outer peripheral surface of the first gear in a radial direction. The groove is inclined downward from the opposing surface to the peripheral opening, and an end on the another side in the axial direction reaches the bearing. The shaft opening of the groove reaches the opposing surface.

The above and other elements, features, steps, characteristics and advantages of the present disclosure will become more apparent from the following detailed description of the example embodiments with reference to the attached drawings.

DETAILED DESCRIPTION

Hereinafter, motor assemblies according to example embodiments of the present disclosure will be described with reference to the drawings. Note that the scope of the present disclosure is not limited to the example embodiments described below, but includes any modifications thereof within the scope of the technical idea of the present disclosure.

Figure 1:
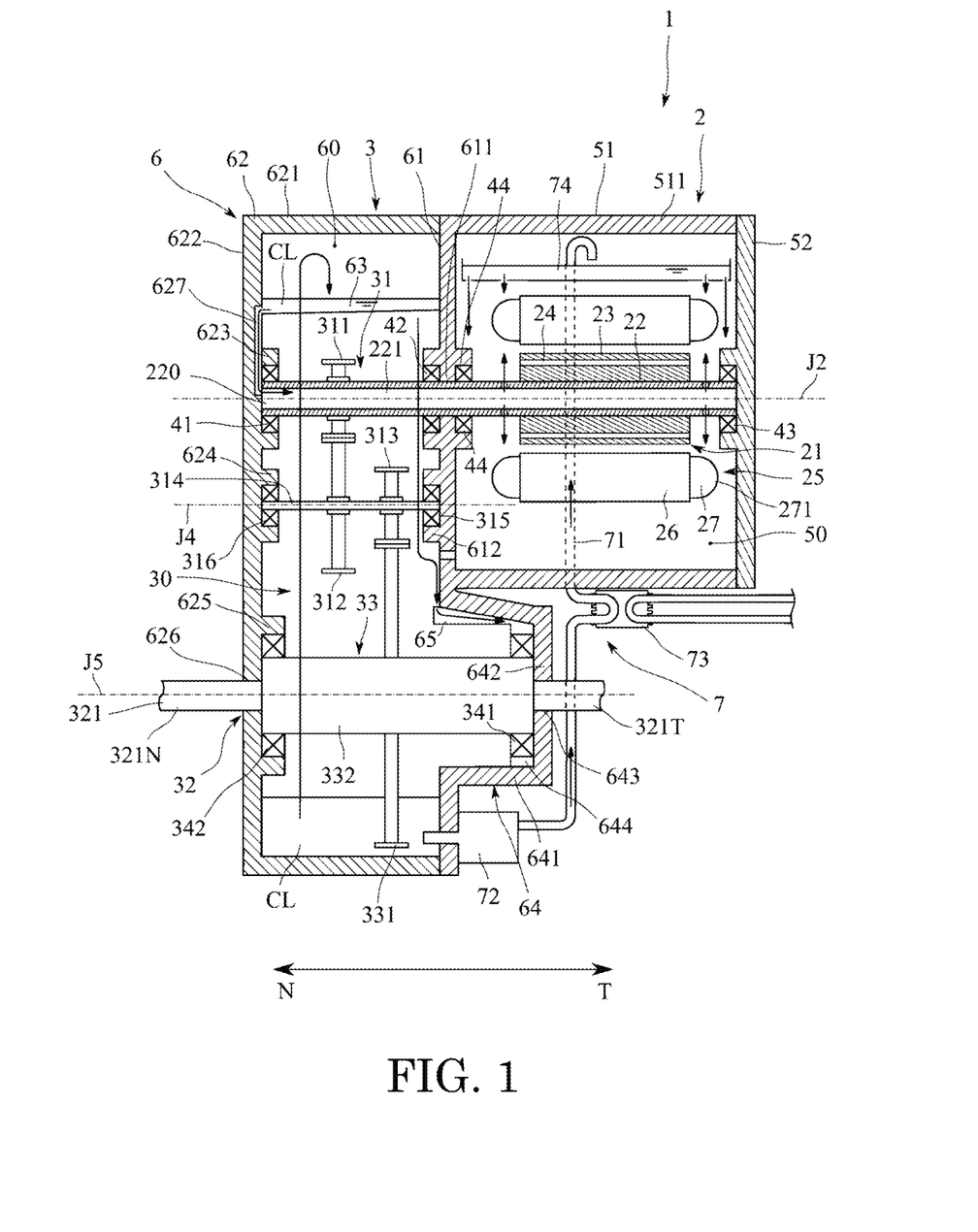
FIG. 1 is a conceptual diagram of a motor assembly according to an example embodiment of the present disclosure.

In the present specification, a direction parallel to a rotation axis J2 of a motor 2 is referred to as an "axial direction" of the motor assembly 1. In the axial direction, as illustrated in FIG. 1, a power transmission device 3 side is defined as one side N in the axial direction, and the motor 2 side is defined as the other side T in the axial direction. A radial direction orthogonal to the rotation axis J2 is simply referred to as a "radial direction", and a circumferential direction around the rotation axis J2 is simply referred to as a "circumferential direction". The "direction parallel to the rotation axis" described in the present specification includes not only a case where the direction is completely parallel to the rotation axis, but also a case where the direction is substantially parallel to the rotation axis. A case where a certain component "extends along" a predetermined direction or a plane includes not only a case where a certain component extends strictly in a predetermined direction but also a case where a certain component extends in a direction inclined within a range of less than 45° with respect to a strict direction.

The motor assembly 1 according to the example embodiment of the present disclosure will be described below with reference to the drawings. FIG. 1 is a conceptual diagram of the motor assembly 1 according to the example embodiment. Note that FIG. 1 is merely the conceptual diagram, and a layout and a dimension of each unit are not necessarily identical to a layout and a dimension of each unit of the actual motor assembly 1.

The motor assembly 1 is mounted on a vehicle such as a hybrid vehicle (HV), a plug-in hybrid vehicle (PHV), and an electric vehicle (EV) in which at least the motor is used as a power source. The motor assembly 1 is used as the power source of the vehicle.

As illustrated in FIG. 1, the motor assembly 1 includes the motor 2 that is a drive source, and the power transmission device 3 that transmits power of the motor 2. As illustrated in FIG. 1, the motor 2 includes a rotor 21 that rotates about the rotation axis J2 extending in a horizontal direction and a stator 25 located outside the rotor 21 in the radial direction.

The motor 2 is a DC brushless motor. The motor 2 is driven by an electric power from an inverter (not illustrated). That is, the motor 2 is an inner rotor type motor in which the rotor 21 is rotatably disposed inward of the stator 25.

An electric power is supplied to the stator 25, and thus, the rotor 21 rotates. As illustrated in FIG. 1, the rotor 21 includes the power shaft 22, a rotor core 23, and a rotor magnet 24. The rotor 21 rotates about the rotation axis J2 extending in the horizontal direction.

A power shaft 22 rotates about the rotation axis J2. The power shaft 22 has a hollow portion 221 penetrating along the rotation axis J2 therein, and has an inlet 220 through which a lubricating oil CL flows into the hollow portion 221 on one side N in the axial direction. The inlet 220 is connected to an oil passage 627 to be described later of a lid 62 to be described later.

The power shaft 22 is rotatably supported by a motor housing 5 and a gear housing 6 with a first bearing 41, a second bearing 42, a third bearing 43, and a fourth bearing 44, to be described later, interposed therebetween.

Note that the power shaft 22 may be dividable at an intermediate portion in the axial direction. When the power shaft 22 can be divided, for example, a screw coupling in which a male screw and a female screw are used can be adopted in the divided power shafts 22. Alternatively, the divided power shafts may be joined by a fixing method such as press-fitting or welding. When the fixing method such as press-fitting or welding is adopted, serrations combining recesses and protrusions extending in the axial direction may be adopted. With such a configuration, it is possible to reliably transmit the rotation. The power shaft 22 may be formed as a single member.

A rotor core 23 is formed by stacking electromagnetic steel plates having a thin plate shape, for example. The rotor core 23 is a columnar body extending along the axial direction. A plurality of rotor magnets 24 are fixed to the rotor core 23. The plurality of rotor magnets 24 are arranged along the circumferential direction while magnetic poles are alternately disposed.

As illustrated in FIG. 1, the stator 25 includes a stator core 26, a coil 27, and an insulator (not illustrated) arranged between the stator core 26 and the coil 27. The stator 25 is held by the motor housing 5. The stator core 26 includes a plurality of magnetic pole teeth (not illustrated) extending inward in the radial direction from an inner peripheral surface of an annular yoke.

The coil 27 is formed by winding a conductive wire around the magnetic pole teeth. The coil 27 includes a coil end 271 protruding from an end face of the stator core 26 in the axial direction.

A resolver (not illustrated) is attached to an end of the power shaft 22 on the other side T in the axial direction. The resolver detects a position of the rotor 21, that is, a rotation angle. A bus bar (not illustrated) is disposed at an end inside the motor housing 5 on the other side T in the axial direction. The bus bar connects an inverter unit (not illustrated) and the coil 27 and supplies an electric power to the coil 27.

As illustrated in FIG. 1, the motor 2 is housed inside the motor housing 5. The motor housing 5 includes a motor housing main body 51 and a bearing holder 52. The motor housing main body 51 and the bearing holder 52 are made of, for example, a conductive material such as iron, aluminum, or an alloy thereof, in other words, metal, but the present disclosure is not limited thereto. Note that the motor housing main body 51 and the bearing holder 52 may be made of the same material or may be made of different materials. In order to suppress contact corrosion of dissimilar metals at a contact portion, the motor housing main bodies and the bearing holder are preferably made of the same material.

The motor housing main body 51 has a tubular shape. An end of the motor housing main body 51 on one side N in the axial direction is covered with a side plate 61 of the gear housing 6 to be described later. The stator core 26 is fixed inside the motor housing main body 51. Note that, in the motor assembly 1 of the present example embodiment, the motor housing main body 51 and the side plate 61 are formed as a single member. As described above, the motor housing main body 51 and the side plate 61 are formed as the single member, and thus, the rigidity of the motor housing 5 can be enhanced.

The bearing holder 52 is fixed to the other side T in the axial direction of the motor housing main body 51. An end of the motor housing main body 51 on the other side T in the axial direction is covered with the bearing holder 52. The fixing of the bearing holder 52 to the motor housing main body 51 may be, for example, fixing with a screw, but is not limited thereto, and a method for firmly fixing the bearing holder 52 to the motor housing main body 51, such as screwing or press-fitting, can be widely adopted.

Accordingly, the motor housing main body 51 and the bearing holder 52 are in close contact with each other. Here, the close contact means that the lubricating oil CL inside the member does not leak to the outside and has sealability to the extent that foreign matters such as external water, dirt, and dust do not enter. It is assumed that the same configuration is applied below for the close contact.

A third bearing 43 rotatably holding the end of the power shaft 22 on the other side T in the axial direction is attached to the bearing holder 52. In other words, the end of the power shaft on the other side T in the axial direction is rotatably supported by the motor housing 5 with the third bearing 43 interposed therebetween.

Details of the power transmission device 3 will be described with reference to the drawings. In the motor assembly 1, the power transmission device 3 transmits the power of the motor 2 to a shaft (not illustrated) disposed outside the motor assembly 1. For example, when the motor assembly 1 is used to drive the vehicle, the external shaft is a drive shaft of the vehicle. As illustrated in FIG. 1, the power transmission device 3 includes a gear portion 30 and the gear housing 6.

The gear portion 30 includes a reduction gear 31 and an output shaft 32. As illustrated in FIG. 1, the reduction gear 31 is connected to the power shaft 22. The reduction gear 31 has a function of reducing a rotation speed of the motor 2 to increase torque output from the motor 2 according to a reduction ratio. The reduction gear 31 transmits the torque output from the motor 2 to the output shaft 32. That is, the gear portion 30 is connected to one side N in the axial direction of the power shaft 22 that rotates about the rotation axis J2 extending along the horizontal direction.

The reduction gear 31 includes a main drive gear 311, an intermediate driven gear 312, a final drive gear 313, and an intermediate shaft 314. The torque output from the motor 2 is transmitted to a first gear 331 of the output shaft 32 via the power shaft 22, the main drive gear 311, the intermediate driven gear 312, the intermediate shaft 314, and the final drive gear 313. The number of gears, the gear ratios of the gears, and so on can be modified in various manners in accordance with a desired reduction ratio. The reduction gear 31 is a parallel shaft gear type reduction gear in which axial centers of the respective gears are disposed in parallel.

The main drive gear 311 is disposed on the outer peripheral surface of the power shaft 22. The main drive gear 311 may be the same member as the power shaft 22, or may be another member and be firmly fixed. The main drive gear 311 rotates about the rotation axis J2 together with the power shaft 22.

The intermediate shaft 314 is arranged to extend along an intermediate axis J4 parallel to the rotation axis J2. Both ends of the intermediate shaft 314 are rotatably supported by the gear housing 6 about the intermediate axis J4 via the first intermediate bearing 315 and the second intermediate bearing 316. The intermediate driven gear 312 and the final drive gear 313 are provided on the outer peripheral surface of the intermediate shaft 314. The intermediate driven gear 312 may be the same member as the intermediate shaft 314, or may be another member and be firmly fixed. The final drive gear 313 is similar to the intermediate driven gear 312.

The intermediate driven gear 312 and the final drive gear 313 rotate integrally with the intermediate shaft 314 about the intermediate axis J4. The intermediate driven gear 312 meshes with the main drive gear 311. The final drive gear 313 meshes with the first gear 331 of the output shaft 32.

The torque of the power shaft 22 is transmitted from the main drive gear 311 to the intermediate driven gear 312. The torque transmitted to the intermediate driven gear 312 is transmitted to the final drive gear 313 via the intermediate shaft 314. Furthermore, the torque is transmitted from the final drive gear 313 to the output shaft 32.

Figure 2:
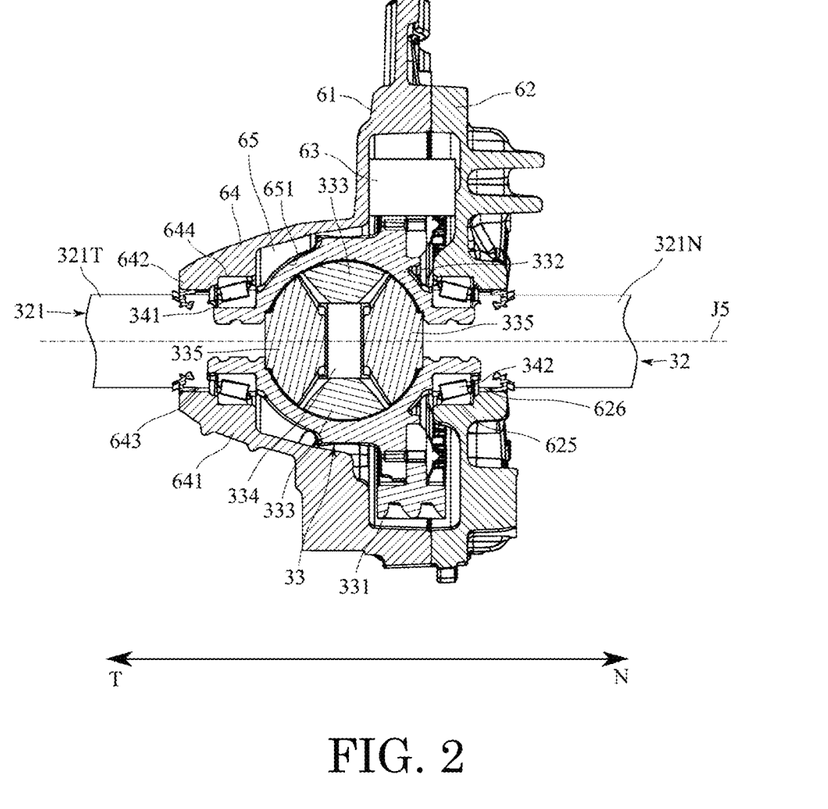
FIG. 2 is a cross-sectional view of an output shaft according to an example embodiment of the present disclosure.

FIG. 2 is a cross-sectional view of the output shaft 32. As illustrated in FIGS. 1 and 2, the output shaft 32 includes output shaft main bodies 321 disposed on one side N and the other side T in the axial direction, and a differential 33. That is, the output shaft 32 includes the differential 33. The output shaft main body 321 has a columnar shape, and a center thereof coincides with a differential axis J5 parallel to the rotation axis J2. The output shaft main bodies 321 are rotated about the differential axis J5 by the torque transmitted from the reduction gear 31. Note that, in the case of a configuration in which a rotation difference does not occur between the output shaft main bodies 321, the differential 33 may be omitted. In this case, one output shaft 32 may be provided, and the first gear 331 to be described later may be directly fixed to the output shaft 32. Note that, in the following description, the output shaft main bodies 321 may be referred to as an output shaft main body 321N on one side N in the axial direction and an output shaft main body 321T on the other side T in the axial direction as necessary.

As illustrated in FIG. 2, the differential 33 includes the first gear 331, a case 332, a pair of pinion gears 333, a pinion shaft 334, and a pair of side gears 335. That is, the gear portion 30 includes the first gear 331 attached to the output shaft 32. The pair of pinion gears 333, the pinion shaft 334, and the pair of side gears 335 are disposed inside the case 332.

The first gear 331 is a ring gear of the differential 33. The first gear 331 is fixed to an outer surface of the case 332 by screwing. The first gear 331 meshes with the final drive gear 313, and the first gear 331 and the case 332 rotate about the differential axis J5. The case 332 of the differential 33 is disposed in a recess 64 of the gear housing 6 to be described later. Although details will be described later, the case 332 is rotatably supported by the gear housing 6 by using a first output bearing 341 and a second output bearing 342.

Note that the fixing of the first gear 331 to the case 332 is not limited to screwing, and a method for firmly fixing the first gear 331 to the case 332, such as press-fitting, welding, or fusion bonding, can be widely adopted. A lower end of the first gear 331 is disposed inside the lubricating oil CL stored in a lower portion of the gear housing 6 (see FIG. 1). Thus, when the first gear 331 rotates, the lubricating oil CL is scraped up by gear teeth of the first gear 331. The gears and bearings of the gear portion 30 are lubricated or cooled by the lubricating oil CL scraped up by the first gear 331. The scraped lubricating oil CL is stored in a saucer 63 to be described later, and is also used for cooling the motor 2 via the power shaft 22. Details of the lubrication and cooling by the lubricant CL will be described later.

The pinion shaft 334 extends from an inner surface of the case 332 in a direction orthogonal to the differential axis J5. Both ends of the pinion shaft 334 are fixed to the inner surface of the case 332. The pair of pinion gears 333 are rotatably attached to the pinion shaft 334. The pair of pinion gears 333 are bevel gears. The pair of pinion gears 333 are independently rotatable about the pinion shaft 334.

The output shaft main bodies 321 are each inserted into the case 332 from both ends of the case 332 in a direction along the differential axis J5. The output shaft main bodies 321 are rotatably disposed independently of the case 332. The pair of side gears 335 are fixed to portions of the output shaft main bodies 321 inserted into the case 332. The pair of side gears 335 are bevel gears and mesh with the pair of pinion gears 333.

In the differential 33, when there is no rotation difference between the output shaft main bodies 321, the pair of pinion gears 333 rotate about the differential axis J5 together with the case 332 in a state in which the rotation around the pinion shaft 334 is stopped. The torque is transmitted from the case 332 to the pair of side gears 335 meshed with the pair of pinion gears 333. Accordingly, the output shaft main bodies 321 rotate in the same direction and at the same rotational speed. The torque of the same magnitude is transmitted to the output shaft main bodies 321.

On the other hand, when there is the rotation difference between the output shaft main bodies 321, the pair of pinion gears 333 rotate about the differential axis J5 together with the case 332 in a state in which the pair of pinion gears rotate about the pinion shaft 334, and thus, a rotation difference between the pair of side gears 335 is absorbed. The torque is transmitted from the case 332 to the pair of side gears 335 meshed with the pair of pinion gears 333. At this time, the same torque is transmitted to the output shaft main bodies 321 while the rotation difference is absorbed.

The output shaft main bodies 321 protrude to the outside of the gear housing 6. For example, a drive shaft (not illustrated) connected to drive wheels of the vehicle is connected to the output shaft main bodies 321.

Figure 3:
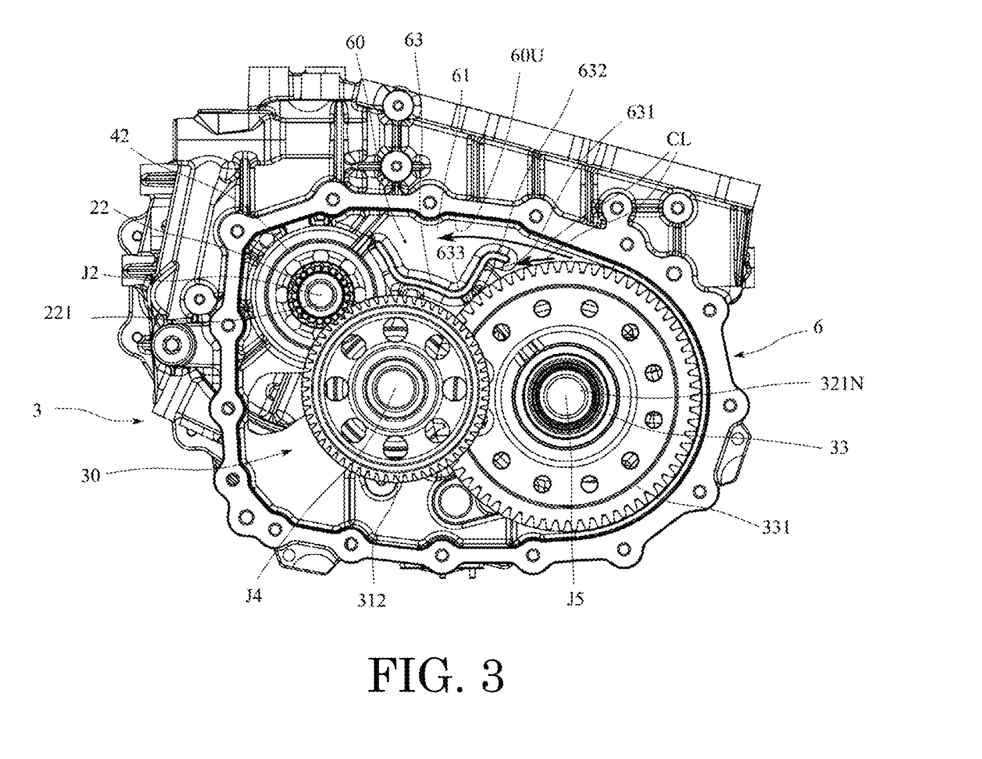
FIG. 3 is a diagram of a gear housing according to an example embodiment of the present disclosure viewed from an axial direction in a state in which a lid of the gear housing is removed.
Figure 4:
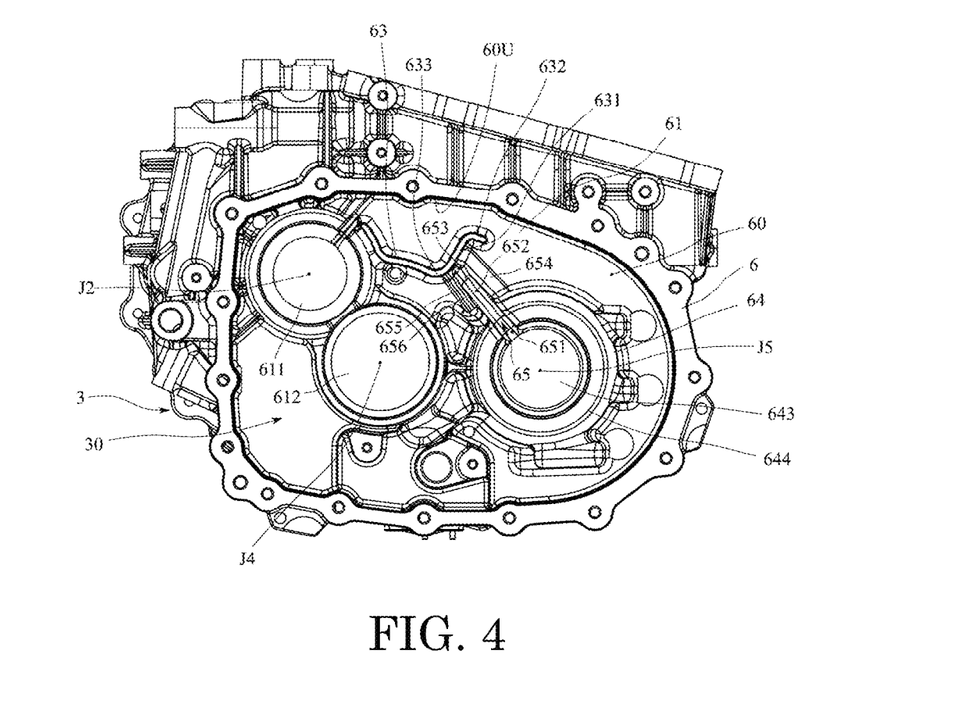
FIG. 4 is a diagram of the gear housing viewed the axial direction of a side plate of the gear housing.
Figure 5:
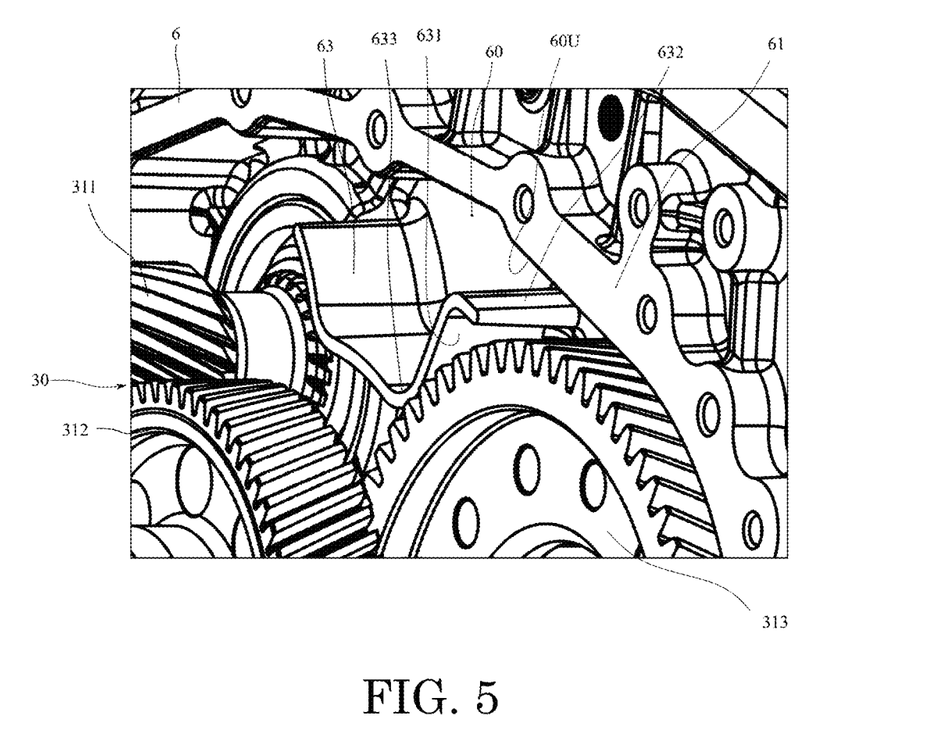
FIG. 5 is an enlarged perspective view of a saucer according to an example embodiment of the present disclosure.
Figure 6:
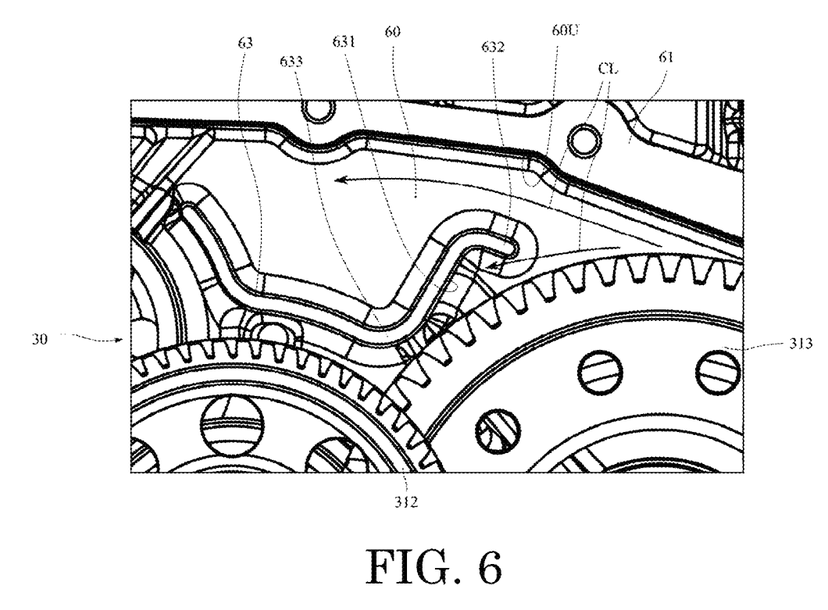
FIG. 6 is an enlarged side view of the saucer.
Figure 7:
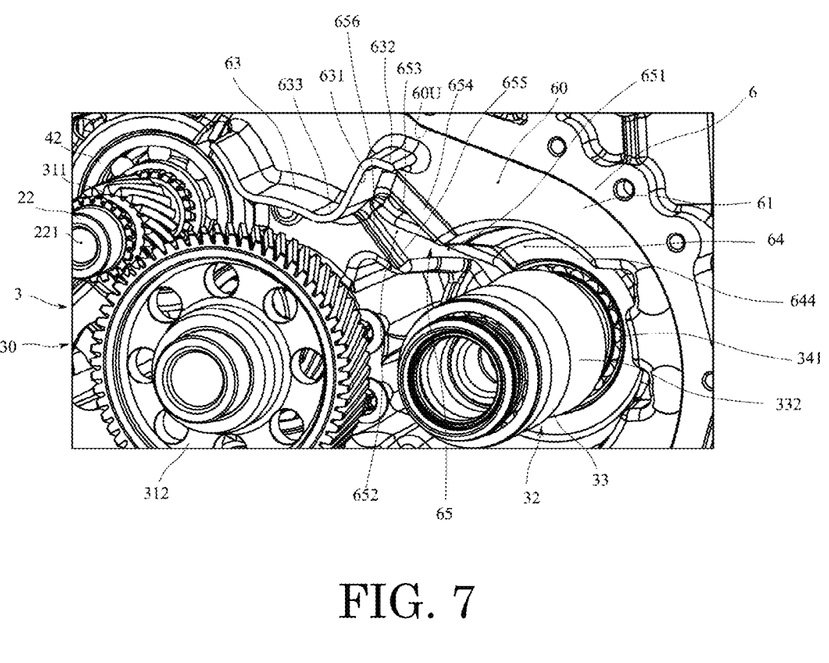
FIG. 7 is an enlarged perspective view of a recess and a case of a differential according to an example embodiment of the present disclosure.
Figure 8:
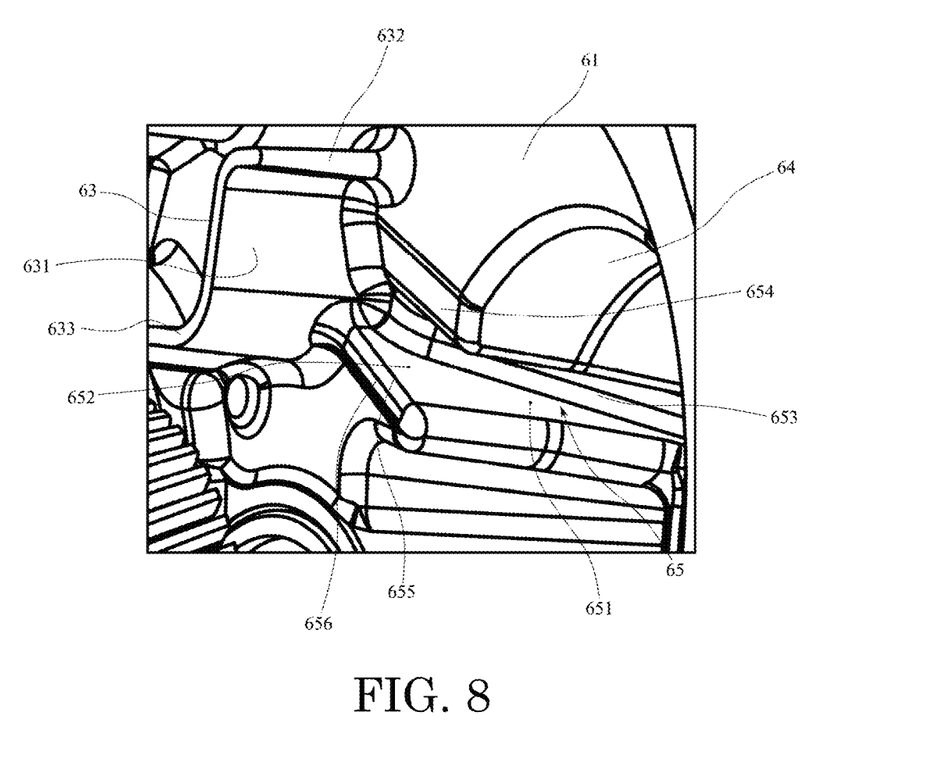
FIG. 8 is an enlarged perspective view of a groove according to an example embodiment of the present disclosure.
Figure 9:
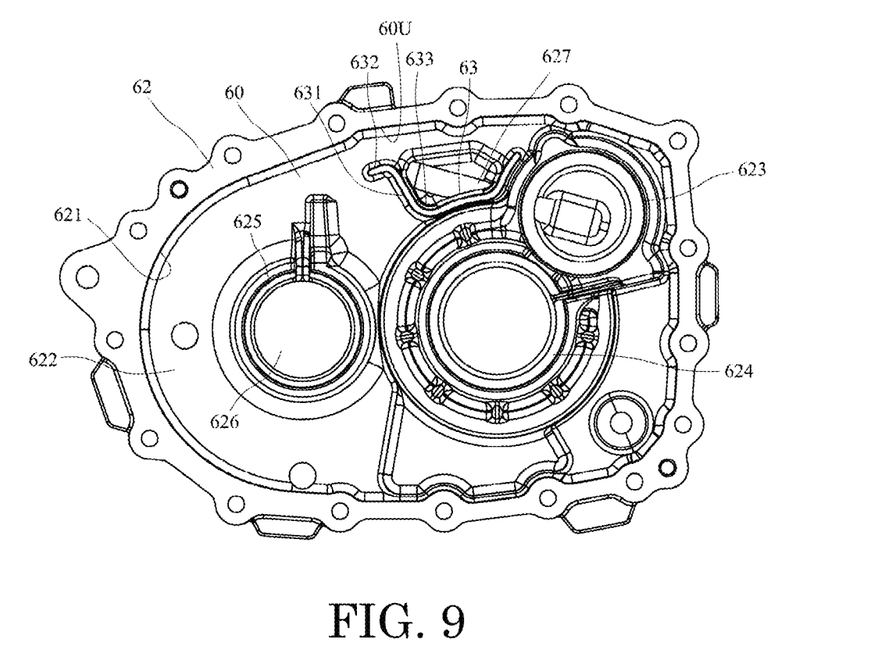
FIG. 9 is a side view of an inside of the lid.

The gear housing 6 will be described with reference to the drawings. FIG. 3 is a diagram when viewed from the axial direction in a state in which the lid 62 of the gear housing 6 is removed. FIG. 4 is a diagram when viewed from the axial direction of the side plate 61 of the gear housing 6. FIG. 5 is an enlarged perspective view of the saucer 63. FIG. 6 is an enlarged side view of the saucer 63. FIG. 7 is an enlarged perspective view of the recess 64 and the case 332 of the differential 33. FIG. 8 is an enlarged perspective view of a groove 65. FIG. 9 is a side view of the inside of the lid 62.

As illustrated in FIG. 1, the lubricating oil CL is stored in an internal space 60 of the gear housing 6. The gear portion 30 is housed in the internal space 60 of the gear housing 6. That is, the gear portion 30 is housed in the gear housing 6, and the lubricant CL is stored therein.

The gear housing 6 includes the side plate 61 (see FIGS. 3, 4, and the like), the lid 62, the saucer 63 (see FIGS. 1, 5, 6, and the like), the recess 64 (see FIGS. 2, 7, 8, and the like), and the groove 65 (see FIGS. 7, 8, and the like). The side plate 61 and the lid 62 are made of, for example, a conductive material such as iron, aluminum, or an alloy thereof, in other words, metal, but the present disclosure is not limited thereto. Note that the side plate 61 and the lid 62 may be made of the same material or may be made of different materials. In order to suppress contact corrosion of dissimilar metals at a contact portion, the motor housing main bodies and the bearing holder are preferably made of the same material. Note that the side plate 61 is formed as a single member with the motor housing main body 51 of the motor housing 5 as described above.

As illustrated in FIGS. 1 and 4, the side plate 61 covers the other side T in the axial direction of the gear housing 6. The side plate 61 widens in a direction intersecting the rotation axis J2. More specifically, the side plate 61 widens in a direction orthogonal to the rotation axis J2. A first through-hole 611 is formed in the side plate 61. That is, the gear housing 6 has the side plate 61 which is disposed at the end on the other side T in the axial direction and widens in a direction intersecting the axial direction.

The first through-hole 611 penetrates in the axial direction, and a center thereof coincides with the rotation axis J2. The power shaft 22 is disposed so as to pass through the first through-hole 611. The power shaft 22 is rotatably supported by the side plate 61 with the second bearing 42 and the fourth bearing 44 interposed therebetween. The second bearing 42 is disposed on one side N in the axial direction of the side plate 61, and the fourth bearing 44 is disposed on the other side T in the axial direction of the side plate 61. Accordingly, since the power shaft 22 is supported such that the intermediate portion in the axial direction is rotatable, when the power shaft 22 rotates, deflection, bending, and the like of the power shaft 22 are suppressed.

As illustrated in FIGS. 1 and 4, the side plate 61 includes a first intermediate bearing holding portion 612. The first intermediate bearing holding portion 612 has a tubular shape of which a center overlaps the intermediate axis J4. The first intermediate bearing 315 is attached to the first intermediate bearing holding portion 612.

The recess 64 is formed as a single member with the side plate 61. The recess 64 has a tubular shape extending from a surface of the side plate 61 on the other side T in the axial direction to the other side T in the axial direction. The recess 64 has a tubular portion 641 and a bottom portion 642. The recess 64 opens to one side N in the axial direction. That is, the recess 64 is connected to the inside of the gear housing 6. That is, the gear housing 6 has the tubular recess 64 recessed from the side plate 61 to the other side T in the axial direction and opens to one side N in the axial direction.

A center of the tubular portion 641 coincides with the differential axis J5. The bottom portion 642 has a flat plate shape that widens inward of the tubular portion 641 from an end of the tubular portion 641 on the other side T in the axial direction. The bottom portion 642 has a first output shaft through-hole 643 and a first bearing attachment portion 644 to which the first output bearing 341 is attached. The first output shaft through-hole 643 passes through in the axial direction. The output shaft main body 321T on the other side T in the axial direction passes through the first output shaft through-hole 643 (see FIGS. 1 and 2). An oil seal (not illustrated) is provided between the right output shaft 32 and the first output shaft through-hole 643 in order to suppress leakage of the lubricating oil CL. The first output bearing 341 rotatably supports the case 332 of the differential 33. That is, the gear portion 30 includes the bearing 341 disposed at an end of the recess 64 on the other side T in the axial direction.

The groove 65 is formed on a surface of the side plate 61 on one side N in the axial direction. As illustrated in FIGS. 4 and 7, the groove 65 includes a peripheral opening 651, a shaft opening 652, and an inner peripheral surface 653. The peripheral opening 651 opens to an inner peripheral surface of the recess 64. The shaft opening 652 faces the internal space 60 of the gear housing 6 and opens on the surface of the side plate 61 on one side N in the axial direction. That is, the groove 65 has the peripheral opening 651 that opens to the inner peripheral surface of the recess 64 and the shaft opening 652 that opens to the surface of the side plate 61 on one side N in the axial direction. The peripheral opening 651 faces the case 332 in the radial direction (see FIG. 2). That is, a part of the outer surface of the case 332 faces the groove 65. Note that an edge of the peripheral opening 651 on one side N in the axial direction and an edge of the shaft opening 652 on the case 332 side are continuous.

As illustrated in FIG. 2, the groove 65 extends in the axial direction and reaches the first bearing attachment portion 644 from the surface of the side plate 61 on one side N in the axial direction. One end of the shaft opening 652 of the groove 65 reaches an outer surface (facing surface 631) of the saucer 63 to be described later. The groove 65 is inclined downward from the saucer 63 toward the peripheral opening 651. That is, the groove 65 is inclined downward toward the peripheral opening 651, and an end on the other side T in the axial direction reaches the bearing 341. The inside of the groove 65 is inclined downward toward the peripheral opening 651. More specifically, the groove 65, particularly, the peripheral opening 651 of the groove 65 extends in the axial direction along the case 332 of the differential 33.

The inner peripheral surface 653 facing the peripheral opening 651 and extending from one end of the shaft opening 652 approaches the first bearing attachment portion 644 as the inner peripheral surface is directed toward the other side T in the axial direction. That is, the inner peripheral surface 653 facing the peripheral opening 651 of the groove 65 approaches the bearing 341 as the inner peripheral surface is directed toward the other side T in the axial direction. With this configuration, the lubricating oil CL scraped up by the first gear 331 and touching the opposing surface 631 of the saucer 63 facing the first gear 331 can be stably supplied to the first output bearing 341. Accordingly, the first output bearing 341 can be efficiently lubricated and cooled.

The shaft opening 652 connects an inner periphery of the recess 64 and the saucer 63. That is, the shaft opening 652 of the groove 65 reaches the opposing surface 631. As illustrated in FIGS. 7 and 8, the shaft opening 652 has an upper side edge 654 and a lower side edge 655. The upper side edge 654 of the shaft opening 652 of the groove 65 is directed upward toward one side N in the axial direction. A guide 656 extending from the lower side edge 655 of the shaft opening 652 to one side N in the axial direction is provided.

The lid 62 is attached to one side N in the axial direction of the side plate 61. As illustrated in FIGS. 1 and 9, the lid 62 has a bottomed tubular shape, and includes a lid tubular portion 621 and a lid bottom portion 622. The lid bottom portion 622 widens inward in the radial direction from an end of the lid tubular portion 621 on one side N in the axial direction. An end of the lid tubular portion 621 on the other side T in the axial direction opens and is fixed in close contact with the side plate 61. That is, the gear housing 6 has the lid 62 that covers one side N in the axial direction of the side plate 61.

That is, a portion surrounded by the side plate 61 and the lid 62 is the internal space 60 of the gear housing 6. The fixing of the lid 62 to the side plate 61 is performed by screwing, but is not limited thereto, and may be press-fitted, welded, or the like. However, for maintenance or the like of the gear portion 30 disposed inside, the lid 62 is preferably attachable to and detachable from the side plate 61.

The lid bottom portion 622 includes a lid bearing holding portion 623, a second intermediate bearing holding portion 624, a second output bearing attachment portion 625, a second output shaft through-hole 626, and an oil passage 627. The lid bearing holding portion 623 and the second intermediate bearing holding portion 624 have a tubular shape protruding from a surface of the lid bottom portion 622 on the other side T in the axial direction to the other side T in the axial direction. The lid bearing holding portion 623 holds the first bearing 41. The first bearing 41 holds an end of the power shaft 22 on one side N in the axial direction. Accordingly, a portion of the power shaft 22 disposed inside the gear housing 6 is rotatably supported by the gear housing 6 with the first bearing 41 and the second bearing 42 interposed therebetween.

The second intermediate bearing holding portion 624 holds the second intermediate bearing 316. The second intermediate bearing 316 holds an end of the intermediate shaft 314 on one side N in the axial direction. Accordingly, the intermediate shaft 314 is rotatably disposed in the gear housing 6 at both ends in the axial direction with the first intermediate bearing 315 and the second intermediate bearing 316 interposed therebetween.

A center of the second output shaft through-hole 626 coincides with the differential axis J5, and the output shaft main body 321N on one side N in the axial direction passes therethrough. An oil seal (not illustrated) is disposed in a gap between the output shaft main body 321N on one side N in the axial direction and the second output shaft through-hole 626. The second output bearing attachment portion 625 is disposed outward of the second output shaft through-hole 626 in the radial direction. The second output bearing attachment portion 625 has a cylindrical shape, and a center thereof coincides with the differential axis J5.

The second output bearing 342 is attached to the second output bearing attachment portion 625. The second output bearing 342 holds the case 332 of the differential 33. Accordingly, the case 332 of the differential is rotatably supported by the gear housing 6 with the first output bearing 341 and the second output bearing 342 interposed therebetween. That is, the gear portion 30 includes the output shaft 32 that extends along the rotation axis J2 and is rotatably supported by the gear housing 6 with the bearings 341 and 342 interposed therebetween.

The oil passage 627 is a groove formed on the other side T in the axial direction of the lid bottom portion 622. One end of the oil passage 627 extends to a central portion of the lid bearing holding portion 623. The other end of the oil passage 627 is connected to an end of the saucer 63 on one side N in the axial direction. That is, the lid 62 has the oil passage 627 connected to the saucer 63. The lubricating oil CL stored in the saucer 63 is supplied to the oil passage 627. The lubricating oil CL supplied to the oil passage 627 flows into the hollow portion 221 from the inlet 220 on one side N in the axial direction of the power shaft 22.

The lubricating oil CL scraped up by the first gear 331 is stored in the saucer 63. As illustrated in FIGS. 3, 5, 6, and the like, the saucer 63 is disposed above the intermediate driven gear 312. A bottom portion of the saucer 63 is disposed along an outer periphery of the intermediate driven gear 312. With such a configuration, the saucer 63 can be disposed at a lower position, and the motor housing 5 can be suppressed to a low level.

As illustrated in FIGS. 4 and 9, the saucer 63 extends from the side plate 61 to one side N in the axial direction and opens upward. The end of the saucer 63 on one side N in the axial direction is connected to the lid bottom portion 622. That is, the end of the saucer 63 on one side N in the axial direction is connected to the lid 62.

The saucer 63 has the opposing surface 631. The opposing surface 631 faces the gear teeth of the first gear 331. The entire facing surface 631 may entirely face the gear teeth of the first gear 331 or partially face the gear teeth of the first gear 331. That is, the saucer 63 has the opposing surface 631 facing in the radial direction at least an outer peripheral surface of the first gear 331.

The opposing surface 631 extends upward, and extends in a direction separated from the gear teeth of the first gear 331 as the opposing surface is directed upward. That is, the opposing surface 631 is separated from a peripheral tangent of the first gear 331 at the point where a line connecting a center of the first gear 331 and a lower end of the opposing surface 631 intersects the outer peripheral surface of the first gear 331 as the opposing surface is directed toward the upper portion.

As illustrated in FIG. 4, the saucer 63 has a protrusion 632 protruding from an upper end of the opposing surface 631. That is, the saucer 63 has the protrusion 632 extending in a direction approaching the outer peripheral surface of the first gear 331 from the upper end of the opposing surface 631.

The protrusion 632 extends along an upper surface 60U of the internal space 60 of the gear housing 6. More specifically, a gap between a distal end of the protrusion 632 and the upper surface 60U of the internal space 60 of the gear housing 6 is larger than a gap between the distal end of the protrusion and the first gear 331.

As illustrated in FIG. 9, the saucer 63 has a corner 633 of which a part of a bottom portion is pointed downward. The corner 633 is disposed below the other end of the oil passage 627. That is, a part of an upper surface of the saucer 63 is disposed below the oil passage 627.

The motor assembly 1 includes a coolant circulation unit 7 that circulates the lubricating oil CL. The coolant circulation unit 7 includes a pipe 71, a pump 72, an oil cooler 73, and a motor oil reservoir 74.

The pipe 71 is a pipe formed in the motor housing 5. The pipe 71 connects the pump 72 and the motor oil reservoir 74 disposed inside the motor housing main body 51, and supplies the lubricating oil CL to the motor oil reservoir 74. The pump 72 sucks the lubricating oil CL stored in a lower region of the internal space 60. The pump 72 is an electric pump, but is not limited thereto. For example, the motor assembly 1 may be configured to be driven by using a part of the power of the power shaft 22 of the motor assembly 1.

The oil cooler 73 is disposed between the pump 72 of the pipe 71 and the motor oil reservoir 74. That is, the lubricating oil CL sucked by the pump 72 passes through the oil cooler 73 via the pipe 71, and is sent to the motor oil reservoir 74. For example, a refrigerant such as water supplied from the outside is supplied to the oil cooler 73. Then, heat is exchanged between the refrigerant and the lubricating oil CL to lower a temperature of the lubricating oil CL. Note that the oil cooler 73 is a liquid-cooled type using a refrigerant, but is not limited thereto, and may be a so-called air-cooled type that cools with traveling air of the vehicle. Due to the use of the oil cooler 73, the temperature of the lubricating oil CL supplied to the motor oil reservoir 74 can be lowered, and the cooling efficiency of the motor 2 can be enhanced.

The motor oil reservoir 74 is a tray that is disposed in an upper region inside the motor housing 5 and opens upward. More specifically, the motor oil reservoir 74 is disposed vertically above the stator 25 in a motor housing space 50. A dropping hole is formed in a bottom portion of the motor oil reservoir 74, and the motor 2 is cooled by dropping the lubricating oil CL from the dropping hole. The dropping hole is formed, for example, at an upper portion of the coil end 271 of the coil 27 of the stator 25, and the coil 27 is cooled by the lubricating oil CL.

Next, a lubricating operation and a cooling operation of the motor assembly 1 and the power transmission device 3 will be described. Note that the cooling of the motor 2 by the coolant circulation unit 7 is as described above, and thus, details thereof are omitted.

The lubricating oil CL is stored in the internal space 60 of the gear housing 6. In the internal space 60 of the gear housing 6, a part of the gear teeth of the first gear 331 of the differential 33 is immersed in the lubricating oil CL. The motor rotates, and thus, the rotation is transmitted to the gear portion 30, and the first gear 331 rotates. The gear teeth of the first gear 331 scrape up the lubricating oil CL by the rotation of the first gear 331.

The lubricating oil CL scraped up by the first gear 331 is separated from the first gear 331 at an upper end of the first gear 331. For example, when a peripheral speed of the gear teeth on the outer peripheral surface of the first gear 331 is high, a speed of the lubricating oil CL when the lubricating oil is separated from the first gear 331 is high, and a large amount of the lubricating oil CL scatters along the upper surface 60U of the internal space 60 of the gear housing 6. Thus, most of the lubricating oil CL scraped up by the first gear 331 passes between the upper side of the protrusion 632 of the saucer 63 and the upper surface 60U and is stored in the saucer 63. The lubricating oil CL stored in the saucer 63 flows into the hollow portion 221 from the oil passage 627 of the lid 62 and the inlet 220.

The lubricating oil CL in the hollow portion 221 of the power shaft 22 is pulled toward the other side T in the axial direction by a negative pressure generated by the rotation of the power shaft 22. The lubricating oil CL flowed in the hollow portion 221 is sprayed toward the coil end 271 from an oil spray hole provided in the power shaft 22. The coil 27 is cooled by the lubricating oil CL. The lubricating oil CL is also supplied to the third bearing 43 and the fourth bearing 44 disposed inside the motor housing 5, and the bearings are lubricated and cooled. The lubricating oil CL supplied to the motor housing 5 is stored in the lower portion of the inside of the motor housing 5 and is returned to the internal space 60 of the gear housing 6 via the through-hole provided in the side plate 61.

A part of the lubricating oil CL comes into contact with the surface of the side plate 61 on one side N in the axial direction and flows downward along the surface on one side N in the axial direction. The lubricant CL adhering to the upper portion of the groove 65 of the side plate 61 and flowing downward flows into the groove 65 along the side edge 654 at the upper end of the shaft opening 652 of the groove 65. Accordingly, the lubricating oil CL scraped up by the first gear 331 and flowing down along the surface of the side plate 61 on one side N in the axial direction can be guided to the inside of the groove 65 along the upper side edge 654.

A part of the lubricating oil CL scraped by the first gear 331 is carried to the first gear 331 up to a portion lower than the upper end of the first gear 331 and is separated from the first gear 331. The lubricating oil CL carried to the first gear 331 up to the portion lower than the upper end collides with the opposing surface 631 of the saucer 63. The lubricating oil CL coming into contact with the opposing surface 631 flows downward along the opposing surface 631. The guide 656 is provided at the lower side edge 655 of the shaft opening 652 of the groove 65, and thus, the lubricant CL flowing downward along the opposing surface 631 of the saucer 63 can be guided into the groove 65. Accordingly, the lubricant CL can effectively flow into the differential 33 disposed in the recess 64 and the first output bearing 341.

The groove 65 reaches the first bearing attachment portion 644 of the recess 64. The inner peripheral surface 653 facing the peripheral opening 651 approaches the first bearing attachment portion 644 as the inner peripheral surface is directed toward the first bearing attachment portion 644. Thus, the lubricating oil CL flowed into the groove 65 can be more effectively supplied to the first output bearing 341.

Since the groove 65 has the peripheral opening 651 and the peripheral opening 651 side of the groove 65 is inclined downward, a part of the lubricating oil CL flowed into the groove 65 flows out from the peripheral opening 651 into the recess 64 and flows into the case 332 before the lubricating oil reaches the first output bearing 341. Accordingly, the case 332 and the gears inside the case 332 can be lubricated and cooled.

The saucer 63 has the protrusion 632, and thus, even when the peripheral speed of the outer peripheral surface of the first gear 331 is low and a speed at which the scraped lubricating oil CL separates from the first gear 331 is low, the lubricating oil CL that slowed down halfway adheres to the upper surface of the protrusion 632 and flows into the saucer 63. Thus, it is possible to supply a large amount of the lubricating oil CL to the saucer 63. Accordingly, a large amount of lubricating oil can be supplied to each part via the saucer 63, and the efficiency of the lubrication and cooling of the first output bearing 341 can be enhanced.

Since the protrusion 632 extends along the upper surface 60U of the internal space 60, an appropriate amount of the lubricating oil CL scraped up by the first gear 331 can be sent to the saucer 63. In other words, it is possible to supply a certain amount of the lubricating oil CL also to the groove 65 by causing a certain amount of the lubricating oil CL scraped up by the first gear 331 to collide with a lower surface of the protrusion 632. Accordingly, it is possible to continue to supply a certain amount of the lubricating oil CL to the first output bearing 341 and the differential 33 disposed in the recess 64. Note that the gap between the distal end of the protrusion 632 and the upper surface 60U of the internal space 60 of the gear housing 6 is larger than the gap between the distal end of the protrusion 632 and the first gear 331. By doing this, most of the scraped lubricating oil CL can be guided to the saucer 63.

The upper side of the opposing surface 631 is formed so as to be separated from the first gear 331, and thus, the saucer 63 can be deeply formed deep, and even though a large amount of the lubricating oil CL is supplied to the saucer 63, the lubricating oil CL can be received.

A lower end of the upper surface of the saucer 63 is formed to be lower than a portion of the oil passage 627 connected to the saucer 63. With such a configuration, a certain amount of the lubricating oil CL can be left in the saucer 63, and it is possible to suppress runout of the lubricating oil CL.

In the power transmission device 3 according to the present example embodiment, a part of the lubricating oil CL scraped by the first gear 331 collides with the opposing surface 631 of the saucer 63. The lubricating oil CL flowed along the opposing surface 631 is guided to the groove 65. In the internal space 60 of the gear housing 6, since a certain amount of the lubricating oil CL can be sent to the first output bearing 341 disposed at an end of the recess 64 into which the lubricating oil CL hardly flows, the first output bearing 341 can be effectively lubricated and cooled.

While the example embodiment of the present disclosure and modification examples thereof have been described above, it will be understood that the components according to the example embodiment and a combination thereof are only illustrative and an addition, elimination, and substitution of the components, and other modifications can be made without departing from the scope and spirit of the present disclosure. The present disclosure is not to be limited by the example embodiment.

The power transmission device of the present disclosure can be used as a power transmission mechanism that transmits an output from a power shaft of a motor, an engine, or the like to the outside.

For example, the motor assembly of the present disclosure can be used as a drive motor for a hybrid vehicle (HV), a plug-in hybrid vehicle (PHV), and an electric vehicle (EV).

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A power transmission device comprising:
    a gear portion that is connected to one side in an axial direction of a power shaft which rotates about a rotation axis extending along a horizontal direction; and
    a gear housing that houses the gear portion, and stores a lubricant therein; wherein
    the gear housing includes:
        a side plate at an end on another side in the axial direction and widens in a direction intersecting the axial direction;
        a tubular recess that is recessed to the another side in the axial direction from the side plate, and opens to the one side in the axial direction;
        a saucer that extends to the one direction in the axial direction from the side plate and opens upward; and
        a groove on a surface of the side plate on the one side in the axial direction, includes a shaft opening opposing an inside of the gear housing, and includes a peripheral opening that opens to an inner peripheral surface of the recess;
    the gear portion includes:
        a bearing that is at an end of the recess on the another side in the axial direction;
        an output shaft that extends along the rotation axis, and is rotatably supported by the gear housing with the bearing interposed therebetween; and
        a first gear that is connected to the output shaft;
    the saucer includes an opposing surface opposing at least an outer peripheral surface of the first gear in a radial direction;
    the groove is inclined downward from the opposing surface to the peripheral opening, and an end on the another side in the axial direction reaches the bearing; and
    the shaft opening of the groove reaches the opposing surface.

2. The power transmission device according to claim 1, wherein
    the output shaft includes a differential;
    the first gear is a ring gear of the differential;
    a case of the differential is in the recess; and
    a portion of an outer surface of the case opposes the groove.

3. The power transmission device according to claim 1, wherein an inner peripheral surface opposing the peripheral opening of the groove approaches the bearing as the inner peripheral surface is directed toward the other side in the axial direction.

4. The power transmission device according to claim 1, wherein an upper side edge of the shaft opening of the groove faces upward as the side edge is directed toward the one side in the axial direction.

5. The power transmission device according to claim 1, further comprising a guide that extends from a lower side edge of the shaft opening to the one side in the axial direction.

6. The power transmission device according to claim 1, wherein the saucer includes a protrusion that extends in a direction approaching the outer peripheral surface of the first gear from an upper end of the opposing surface.

7. The power transmission device according to claim 6, wherein the protrusion extends along an upper surface of an internal space of the gear housing.

8. The power transmission device according to claim 6, wherein a gap between a distal end of the protrusion and an upper surface of an internal space of the gear housing is larger than a gap between the distal end of the protrusion and the first gear.

9. The power transmission device according to claim 1, wherein the opposing surface is separated from a peripheral tangent of the first gear at a point where a line connecting a center of the first gear and a lower end of the opposing surface intersects an outer periphery of the first gear as the opposing surface is directed upward.

10. The power transmission device according to claim 1, wherein
    the gear housing includes a lid that covers one side of the axial direction of the side plate;
    an end of the saucer on the one side in the axial direction is connected to the lid;
    the lid includes an oil passage connected to the saucer; and
    a portion of an upper surface of the saucer is below the oil passage.

11. A motor assembly comprising:
    the power transmission device according to claim 1; wherein
    the power source is a motor.

* * * * *